(12) United States Patent
Ohno et al.

(10) Patent No.: US 8,021,621 B2
(45) Date of Patent: Sep. 20, 2011

(54) HONEYCOMB STRUCTURE, EXHAUST GAS PURIFYING APPARATUS, AND METHOD FOR PRODUCING HONEYCOMB STRUCTURE

(75) Inventors: Kazushige Ohno, Ibi-gun (JP); Kazutake Ogyu, Ibi-gun (JP); Yusuke Kondo, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 377 days.

(21) Appl. No.: 12/346,575

(22) Filed: Dec. 30, 2008

(65) Prior Publication Data

US 2009/0238733 A1 Sep. 24, 2009

(30) Foreign Application Priority Data

Mar. 24, 2008 (WO) ............... PCT/JP2008/055464

(51) Int. Cl.
B01D 50/00 (2006.01)
(52) U.S. Cl. .................... 422/180; 422/177
(58) Field of Classification Search ............ 422/177, 422/180; 55/523; 428/73, 116
See application file for complete search history.

(56) References Cited

U.S. PATENT DOCUMENTS

| | | | |
|---|---|---|---|
| 7,455,709 B2 | 11/2008 | Ohno et al. | |
| 7,521,025 B2 | 4/2009 | Ohno et al. | |
| 2003/0041574 A1 | 3/2003 | Noguchi et al. | |
| 2004/0161596 A1 | 8/2004 | Taoka et al. | |
| 2007/0148402 A1 | 6/2007 | Ohno et al. | |
| 2007/0289275 A1 | 12/2007 | Ohno et al. | |
| 2008/0083201 A1 | 4/2008 | Oya et al. | |
| 2008/0176013 A1 | 7/2008 | Ohno et al. | |
| 2008/0254254 A1 | 10/2008 | Ohno et al. | |
| 2008/0276586 A1 | 11/2008 | Oya et al. | |
| 2008/0289307 A1 | 11/2008 | Ogyu et al. | |
| 2008/0292843 A1 | 11/2008 | Oya et al. | |
| 2008/0295470 A1 | 12/2008 | Ogyu et al. | |
| 2009/0113879 A1 | 5/2009 | Ohno | |

FOREIGN PATENT DOCUMENTS

| | | |
|---|---|---|
| EP | 1142619 | 10/2001 |
| EP | 1769837 | 4/2007 |
| EP | 1808217 | 7/2007 |

(Continued)

OTHER PUBLICATIONS

Korean Office Action for corresponding KR Application No. 10-2009-0015208, Feb. 25, 2011.

Primary Examiner — Tom Duong
(74) Attorney, Agent, or Firm — Ditthavong Mori & Steiner, P.C.

(57) ABSTRACT

A honeycomb structure includes at least one honeycomb member including inorganic fibers and having walls extending along a longitudinal direction to define cells. A catalyst is provided on the wall in an amount of at least about 100 g and at most about 400 g per liter of volume of the honeycomb structure. The honeycomb member has a pore distribution measured using mercury porosimetry in which a pore distribution curve has a first peak in a range from about 0.005 μm to about 0.03 μm of a pore diameter, a second peak in a range from about 1 μm to about 15 μm of the pore diameter, and a third peak in a range from about 15 μm to about 50 μm of the pore diameter, where the curve is drawn by plotting the pore diameter (μm) on an X-axis and a log differential pore volume (mL/g) on a Y-axis.

47 Claims, 9 Drawing Sheets

FOREIGN PATENT DOCUMENTS

| | | |
|---|---|---|
| EP | 1839720 | 10/2007 |
| EP | 1852184 | 11/2007 |
| EP | 1852406 | 11/2007 |
| JP | 8-229412 | 9/1996 |
| JP | 2005-248726 | 9/2005 |
| JP | 2007-252997 | 10/2007 |
| KR | 10-2007-0023651 | 2/2007 |
| WO | WO 02/096827 | 12/2002 |
| WO | WO 2006/041174 | 4/2006 |
| WO | WO 2007/129430 | 11/2007 |

A-A line cross-sectional view

B-B line cross-sectional view

HONEYCOMB STRUCTURE, EXHAUST GAS PURIFYING APPARATUS, AND METHOD FOR PRODUCING HONEYCOMB STRUCTURE

CROSS-REFERENCE TO RELATED APPLICATIONS

The present application claims priority under 35 U.S.C. §119 to PCT Application No. PCT/JP2008/055464, filed Mar. 24, 2008, the contents of which are incorporated herein by reference in their entirety.

BACKGROUND OF THE INVENTION

1. Field if the Invention

The present invention relates to a honeycomb structure, an exhaust gas purifying apparatus, and a method for producing a honeycomb structure.

2. Discussion of the Background

In recent years, particulate matter (hereinafter, also referred to as "PM") such as soot discharged from internal combustion engines of vehicles such as buses and trucks, construction machines and the like has raised serious problems as contaminants harmful to the environment and the human body. For this reason, various honeycomb filters, which use a honeycomb structure including a porous ceramic such as cordierite and silicon carbide, have been proposed as filters that capture PM in exhaust gases and purify the exhaust gases.

Further, there has been known a honeycomb structure functions as a catalyst supporting carrier, by supporting a catalyst thereon, for converting CO (carbon monoxide), HC (hydrocarbon), NOx (nitrogen oxides) and the like in exhaust gases.

Furthermore, there has also been known a catalyzed DPF (diesel particulate filter), which is a honeycomb filter supporting a catalyst thereon.

Currently, the exhaust gases from a diesel car are purified (converted) by a combined use of DOC (diesel oxidation catalyst) including a catalyst supporting carrier for converting CO and HC and DPF for capturing PM.

However, since the exhaust gas regulations are expected to become harder in the future, conversion of NOx using NSC (NOx storage catalyst), LNC (lean NOx catalyst), SCR (selective catalytic reduction) or the like is desired.

As an exhaust gas purifying (conversion) system for diesel cars satisfying harder exhaust gas regulations, exhaust gas purifying (conversion) systems using the DOC, DPF, and one of NSC, LNC and SCR in combination have been proposed.

More specifically, a SCR system (inlet-side DOC+SCR catalyst+DPF+outlet-side DOC), a LNC system (DOC+DPF+LNC), and a NSC system (DOC+NSC+DPF) and the like have been proposed.

In order to purify (convert) the exhaust gases by using the above exhaust gas purifying (conversion) systems, a plurality of catalyst supporting carriers and filters including the honeycomb structures need to be disposed in parallel.

However, disposing of a plurality of honeycomb structures may cause the problem that a volume of the honeycomb structures necessary for purifying (converting) the exhaust gases is increased.

To solve the above problem, there has been considered to reduce a number of honeycomb structures to be disposed and to reduce the volume of the honeycomb structures necessary for converting a toxic component by using a catalyzed DPF having an excellent purifying (converting) performance equal to or higher than that of the conventional honeycomb structure.

In consideration of the performance desired for the honeycomb structure having a high NOx converting performance, the honeycomb structure needs to support a larger amount of catalyst compared to the conventional honeycomb structure used as the DOC. Accordingly, the honeycomb structure capable of supporting a large amount of catalyst is desired.

More specifically, the honeycomb structure capable of supporting 100 g/L or more of catalyst, more desirably 250 g/L or more of catalyst, is desired.

In order to support a large amount of catalyst on the honeycomb structure, it is necessary to increase a porosity of the honeycomb structure. More specifically, it is considered that the honeycomb structure needs to have the porosity of 60% or more, more desirably 75% or more.

WO07/129430 A1 discloses one example of the honeycomb structure having a high porosity.

WO07/129430 A1 discloses the honeycomb structure having a high porosity, which is integrally molded through extrusion molding of a material mainly including inorganic fibers.

Since the honeycomb structure including the inorganic fibers is not a sintered body of ceramic particles, the honeycomb structure including the inorganic fibers suitably has a high porosity. WO07/129430 A1 describes a honeycomb filter having a honeycomb structure with cells sealed at either one end by a lamination member for an end portion such as a metal plate.

WO07/129430 A1 further discloses that a catalyst may be supported on part of the inorganic fibers constituting the honeycomb structure.

The contents of WO07/129430 A1 are incorporated herein by reference in their entirety.

SUMMARY OF THE INVENTION

According to one aspect of the present invention, a honeycomb structure includes at least one honeycomb member. The honeycomb member includes inorganic fibers and has walls extending along a longitudinal direction of the honeycomb member to define cells which are sealed at either one end. A catalyst is provided on the wall in an amount of at least about 100 g and at most about 400 g per liter of volume of the honeycomb structure. The honeycomb member has a pore distribution measured using mercury porosimetry. In the pore distribution, a pore distribution curve has a first peak in a range from about 0.005 μm to about 0.03 μm of a pore diameter, a second peak in a range from about 1 μm to about 15 μm of the pore diameter, and a third peak in a range from about 15 μm to about 50 μm of the pore diameter, where the pore distribution curve is drawn by plotting the pore diameter (μm) on an X-axis and a log differential pore volume (mL/g) on a Y-axis.

According to another aspect of the present invention, an exhaust gas purifying apparatus includes a honeycomb structure, a holding material, and a metal casing. The holding material is wrapped around a peripheral portion of the honeycomb structure. The metal casing houses the honeycomb structure around which the holding material is wrapped. The honeycomb structure includes at least one honeycomb member including inorganic fibers and having walls extending along a longitudinal direction of the honeycomb member to define cells which are sealed at either one end. A catalyst is provided on the wall in an amount of at least about 100 g and at most about 400 g per liter of volume of the honeycomb structure. The honeycomb member has a pore distribution measured using mercury porosimetry. In the pore distribution, a pore distribution curve has a first peak in a range from about 0.005 μm to about 0.03 μm of a pore diameter, a second peak in a range from about 1 μm to about 15 μm of the pore diameter, and a third peak in a range from about 15 μm to about 50 μm of the pore diameter, where the pore distribution curve is drawn by plotting the pore diameter (μm) on an X-axis and a log differential pore volume (mL/g) on a Y-axis.

According to further aspect of the present invention, a method for producing a honeycomb structure includes preparing a mixture including inorganic fibers. The mixture is molded to produce a honeycomb molded body which has a longitudinal direction and walls extending along the longitudinal direction to define cells. The honeycomb molded body is dried to produce a dried honeycomb molded body. The dried honeycomb molded body is fired to produce a honeycomb member. The cells of the honeycomb member are sealed at either one end to produce a sealed honeycomb member. The honeycomb structure includes the honeycomb member on which a catalyst is provided. The catalyst is provided on the walls of the sealed honeycomb member. An amount of the catalyst provided on the walls is at least about 100 g and at most about 400 g per liter of volume of the honeycomb structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1A:
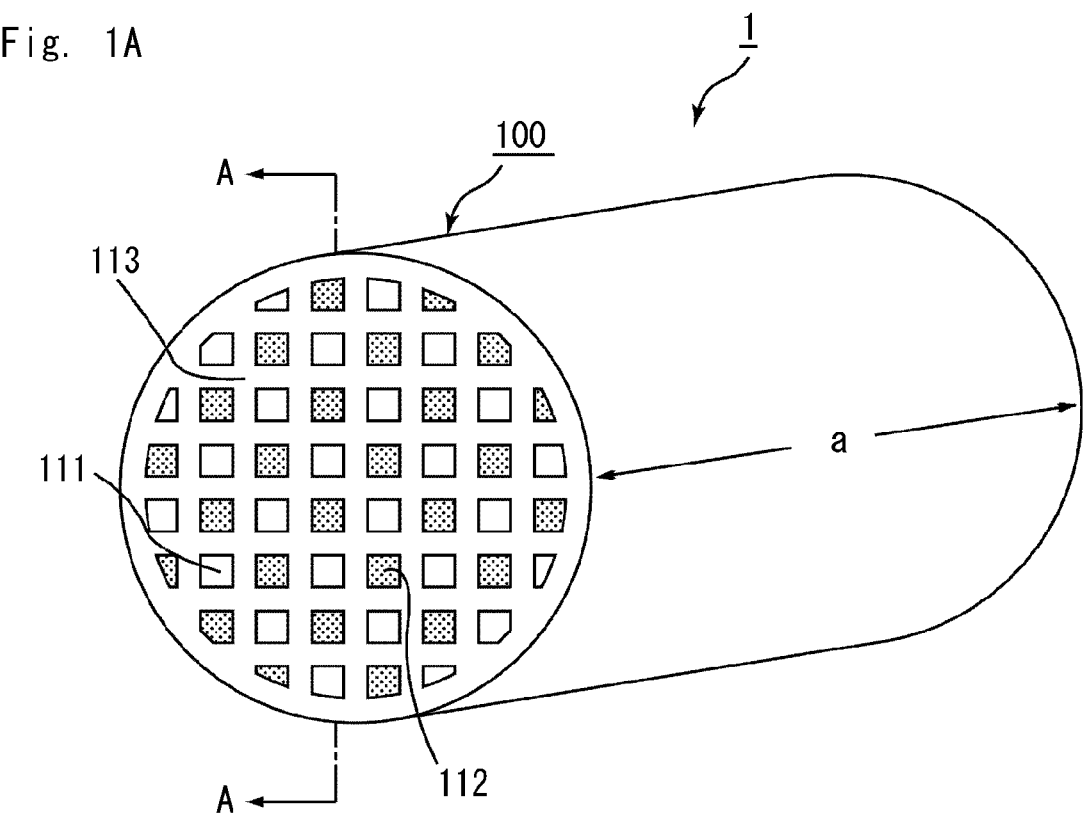
FIG. 1A is a perspective view schematically showing one example of a honeycomb structure according to one embodiment of the present invention.

Embodiments will now be described with reference to the accompanying drawings, wherein like reference numerals designate corresponding or identical elements throughout the various drawings.

A honeycomb structure according to one embodiment of the present invention includes: a honeycomb member having a large number of cells longitudinally disposed in parallel with one another with a wall portion interposed therebetween and mainly including inorganic fibers that are integrally molded therein, wherein the cells are sealed at either one end; a catalyst is supported on the wall portion in an amount of at least about 100 g and at most about 400 g per liter of volume of the honeycomb structure; and the honeycomb member presents a pore distribution curve having three peaks in ranges of at least about 0.005 μm and at most about 0.03 μm, at least about 1 μm and at most about 15 μm, and at least about 15 μm and at most about 50 μm of a pore diameter in a pore distribution by mercury porosimetry, the pore distribution curve being drawn by plotting the pore diameter (μm) on an X-axis and a log differential pore volume (mL/g) on a Y-axis.

The honeycomb member constituting the honeycomb structure according to the embodiment of the present invention mainly includes inorganic fibers integrally molded. Accordingly, a honeycomb structure having high strength even with a high porosity tends to be obtained.

Further, since the cells are sealed at either one end, it may become easier to immerse the honeycomb member with the cells sealed at either one end in a catalyst-containing slurry. Accordingly, when the honeycomb member is immersed in the slurry with one end face down and removed from the slurry, the slurry does not flow out from the cell sealed at the bottom end. The slurry remaining in the cell sealed at the bottom end comes out from the neighboring cell not sealed at the bottom end via a wall portion.

It may therefore become easier to support a large amount of catalyst on the honeycomb member by increasing the amount of the catalyst remaining in the wall portion before firing.

Consequently, the amount of the catalyst supported on the honeycomb member tends to be increased to at least about 100 g/L and at most about 400 g/L and the honeycomb structure having an excellent converting performance of CO, HC, NOx and the like tends to be obtained.

In the honeycomb structure according to the embodiment of the present invention, the honeycomb member constituting the honeycomb structure presents a pore distribution curve having three peaks.

This means that the honeycomb member constituting the honeycomb structure has a pore diameter distribution controlled in preferable ranges.

Pores having a pore diameter in the ranges of at least about 15 μm and at most about 50 μm and of at least about 1 μm and at most about 15 μm tend to serve to keep the low pressure loss and to improve the capture efficiency of PM.

Pores having a pore diameter in the range of at least about 0.005 μm and at most about 0.03 μm tend to serve to convert toxic components (CO, HC, NOx, and the like).

It is to be noted that, in the present specification, the catalyst includes an oxide, a noble metal, an alkali metal, and an alkali-earth metal. Further, the amount of the catalyst is a total amount of the oxide, the noble metal, the alkali metal, and the alkali-earth metal.

Furthermore, in the present specification, for example, the amount of the catalyst supported on the honeycomb structure being 250 g/L means that the catalyst is supported on the honeycomb structure in the amount of 250 g per liter of volume of the honeycomb structure.

The following will discuss effects of the honeycomb structure according to the embodiment of the present invention superior to those of the conventional honeycomb structure.

In order to increase an amount of a catalyst to be supported on the honeycomb structure, it may presumably be necessary to increase a porosity of the honeycomb structure.

However, when the honeycomb structure including a porous ceramic has a high porosity (for example 60% or more), strength of the porous ceramic tends to be reduced according to an increase of the porosity, whereby the honeycomb structure may easily be damaged.

Further, when a catalyst is supported on the honeycomb structure including the porous ceramic in an amount of 100 g/L or more, most pores of the honeycomb structure tend to be covered with the catalyst. Accordingly, the honeycomb structure supporting 100 g/L or more of the catalyst may have a high pressure loss.

In other words, it may presumably be difficult to use the honeycomb structure including the porous ceramic which supports 100 g/L or more of the catalyst thereon as a honeycomb filter.

On the other hand, a honeycomb structure mainly including inorganic fibers as described in WO07/129430 A1 suitably has a high porosity and may presumably be hardly damaged even with the porosity of 60% or more.

When the honeycomb structure including inorganic fibers is used as the honeycomb filter, the honeycomb structure and the lamination member for an end portion are laminated in a metal casing (a metal can-type body) to be mounted in an exhaust pipe and fixed with a fixing metal member, so that the honeycomb filter is formed.

When the honeycomb structure is fixed, the cells thereof are sealed.

The honeycomb structure supporting the catalyst thereon is preferably obtained by preparing a slurry containing a catalyst including a noble metal and the like, and an oxide, immersing a honeycomb structure in the slurry, and firing the honeycomb structure.

However, in the case of supporting the catalyst on the honeycomb structure mainly including inorganic fibers as described in WO07/129430 A1, it may presumably be difficult to immerse the honeycomb structure in the slurry after the honeycomb structure is fixed in a metal casing to form a honeycomb filter. Therefore, a honeycomb structure having cells is immersed in the slurry and then fired, so that the honeycomb structure supporting the catalyst thereon is obtained.

However, in such a method to support a catalyst, since the slurry containing the catalyst flows out from the cells when the honeycomb structure is removed from the catalyst-containing slurry, the amount of catalyst remaining in the cells before firing is presumably smaller.

For this reason, it may presumably be difficult to support a large amount of catalyst on the honeycomb structure mainly including inorganic fibers as described in WO07/129430 A1.

On the other hand, the honeycomb structure according to the embodiment of the present invention tends to be a honeycomb structure supporting a large amount of catalyst, having an excellent purifying (converting) performance of CO, HC, NOx and the like and having a low pressure loss.

First Embodiment

The following will discuss an embodiment of the honeycomb structure of the present invention with reference to drawings.

Figure 1B:
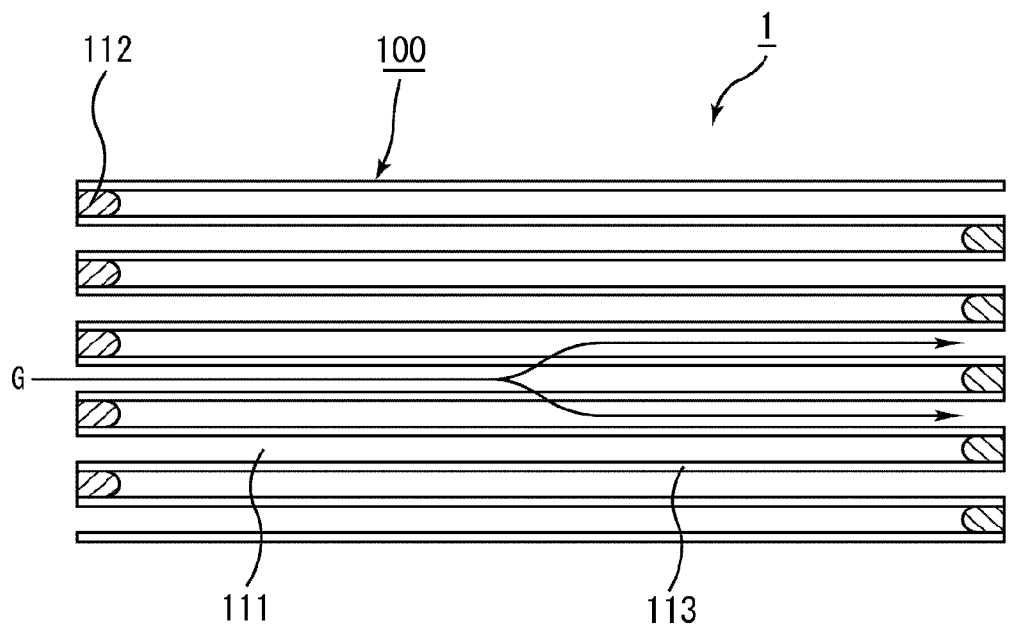
FIG. 1B is an A-A line cross-sectional view of the honeycomb structure shown in FIG. 1A.

FIG. 1A is a perspective view schematically showing one example of a honeycomb structure according to the embodiment of the present invention, and FIG. 1B is an A-A line cross-sectional view of the honeycomb structure shown in FIG. 1A.

A honeycomb structure 1 shown in FIG. 1A and FIG. 1B includes a single unit of a round pillar-shaped honeycomb member 100 mainly including inorganic fibers that are integrally molded.

The honeycomb member 100 has a large number of cells 111 longitudinally (the direction "a" in FIG. 1A) disposed in parallel with one another with a wall portion 113 interposed therebetween. Each of the cells 111 is sealed at either one end with a plug 112.

Therefore, exhaust gases G flowing into one cell 111 with an opening on one end face are to be discharged from another cell 111 with an opening on the other end face after surely passing through the wall portion 113 between the cells 111. Accordingly, the wall portion 113 serves as a filter for capturing PM.

The honeycomb member 100 mainly includes inorganic fibers. However, the honeycomb member 100 further includes an inorganic material in addition to the inorganic fibers, and the shape of the honeycomb member is maintained by firmly fixing the inorganic fibers one another by interposing the inorganic material.

The inorganic material exists locally at the intersection of the inorganic fibers or in the vicinity thereof.

Further, a material obtained by drying and solidifying a paste including an inorganic binder, an organic binder, and at least one of inorganic fibers and inorganic particles may be used as the plug 112.

The wall portion 113 of the honeycomb member 100 supports a catalyst in an amount of at least about 100 g and at most about 400 g per liter of volume of the honeycomb structure thereon.

In the present embodiment, the catalyst to be supported on the wall portion 113 of the honeycomb member 100 includes a catalyst component for converting NOx in the exhaust gases and an oxide.

Examples of the catalyst component for converting NOx in the exhaust gases may include an alkali metal or an alkali-earth metal. Among the alkali metals, potassium, sodium and the like is desirable. Among the alkali-earth metals, barium and the like are desirable.

Examples of the catalyst component for converting NOx in the exhaust gases may further include zeolite, titania and the like.

Each of these catalysts serving as the catalyst components may be used alone or two or more kinds of these may be used in combination.

Furthermore, the oxide serves as a catalyst supporting layer for supporting the catalyst component. The oxide is desirably a material having a large specific surface area and capable of supporting the catalyst in a highly dispersed manner. Examples of the oxide may include oxide ceramics such as alumina, ceria, zirconia, silica, and mullite.

Each of these materials may be used alone or two or more kinds of these may be used in combination.

Among them, those having a large specific surface area of about 250 m$^2$/g or more are desirably selected, and γ-alumina is particularly desirable.

With respect to porosity of the honeycomb member supporting the catalyst thereon, a desirable lower limit is about 35% and a desirable upper limit is about 50%.

The porosity of about 35% or more tends not to increase the pressure loss.

On the other hand, the porosity of about 50% or less tends not to reduce the capture efficiency of PM.

Furthermore, the pore distribution of the wall portion of the honeycomb member supporting the catalyst thereon is measured by mercury porosimetry. The pore distribution curve obtained by plotting the pore diameter (μm) on an X-axis and the log differential pore volume (mL/g) on a Y-axis has three peaks in ranges of at least about 0.005 μm and at most about 0.03 μm, at least about 1 μm and at most about 15 μm, and at least about 15 μm and at most about 50 μm of the pore diameter.

In the following, the pore distribution curve will be described.

Figure 2:
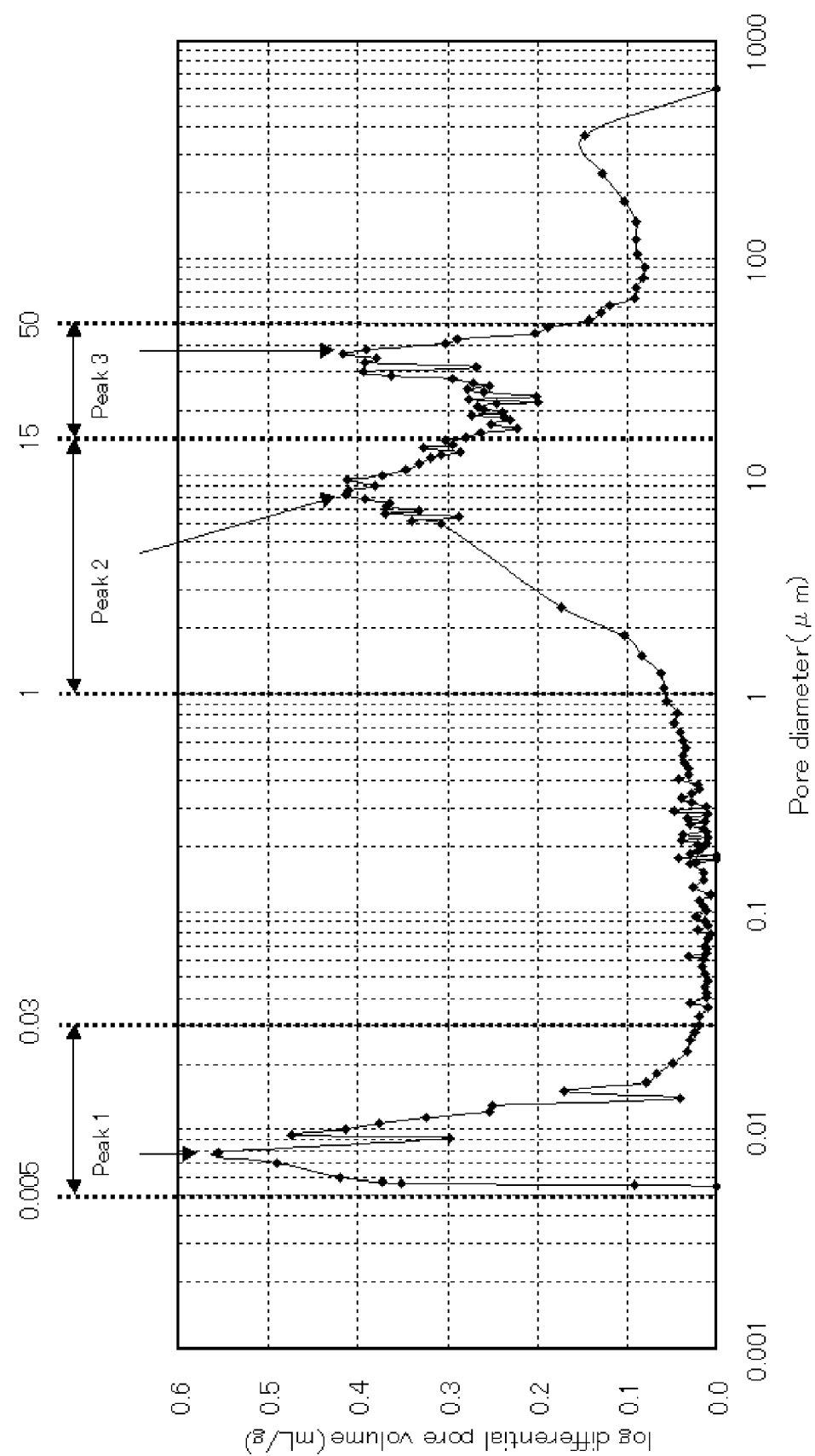
FIG. 2 is one example of a pore distribution curve of a wall portion of a honeycomb member constituting the honeycomb structure according to the embodiment of the present invention.
Figure 3:
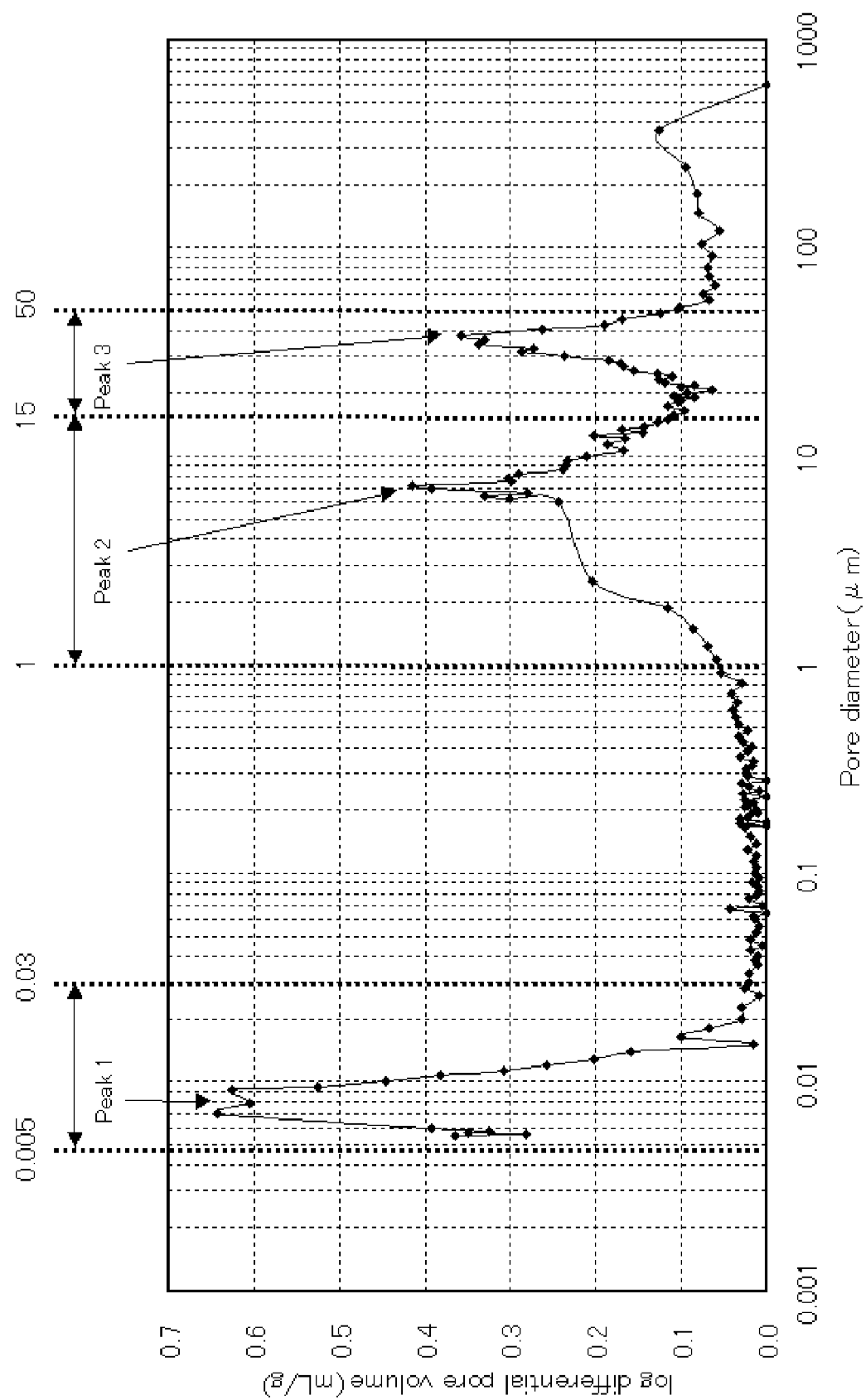
FIG. 3 is another example of the pore distribution curve of the wall portion of the honeycomb member constituting the honeycomb structure according to the embodiment of the present invention.
Figure 4:
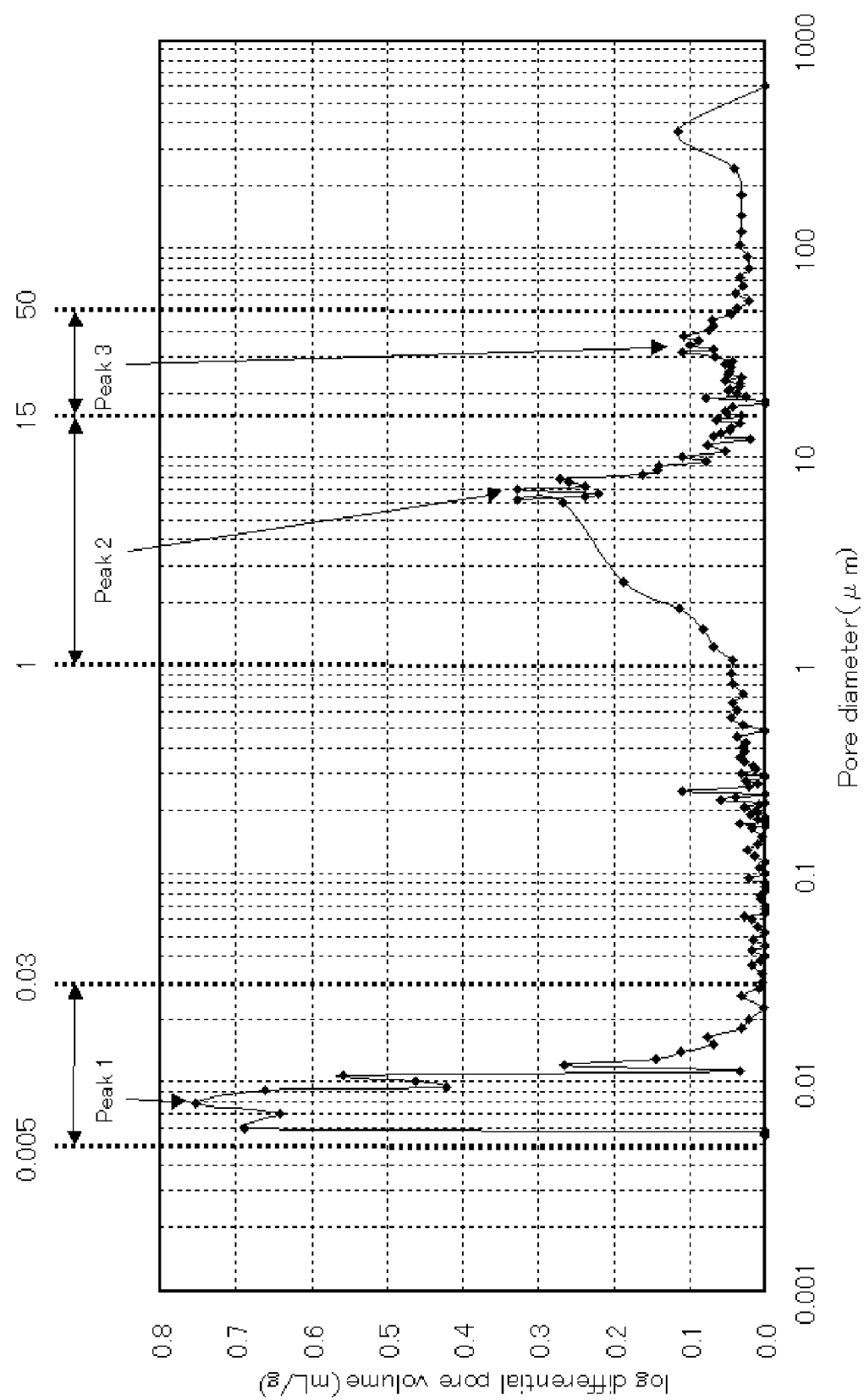
FIG. 4 is yet another example of the pore distribution curve of the wall portion of the honeycomb member constituting the honeycomb structure according to the embodiment of the present invention.

Each of FIGS. 2, 3, and 4 shows an example of a measurement result of the pore distribution curve of the wall portion of the honeycomb member constituting the honeycomb structure according to the embodiment of the present invention.

Barium and potassium as the catalyst components and γ-alumina as the oxide are supported on the honeycomb members used to measure the pore distributions as shown in FIGS. 2, 3, and 4. FIGS. 2, 3, and 4 respectively show the pore distribution curves of the honeycomb members supporting 150 g/L, 200 g/L, and 300 g/L of the catalyst including barium, potassium and γ-alumina.

The pore distribution curve can be obtained by cutting a part of the wall portion of the honeycomb member supporting the catalyst thereon and applying the mercury porosimetry to the cut part of the wall portion.

In each drawing, a peak in the range of at least about 0.005 μm and at most about 0.03 μm of the pore diameter is shown as "Peak 1", a peak in the range of at least about 1 μm and at most about 15 μm of the pore diameter is shown as "Peak 2", and a peak in the range of at least about 15 μm and at most about 50 μm of the pore diameter is shown as "Peak 3".

As shown in FIGS. 2, 3, and 4, each of the pore distribution curves of the wall portions of the honeycomb members constituting the honeycomb structure according to the embodiment of the present invention has three peaks.

Peak 1 existing in the range of at least about 0.005 μm and at most about 0.03 μm of the pore diameter is presumably a peak derived from the primary particles of γ-alumina.

Peak 2 existing in the range of at least about 1 μm and at most about 15 μm of the pore diameter is presumably a peak derived from the secondary particles of γ-alumina.

Peak 3 existing in the range of at least about 15 μm and at most about 50 μm of the pore diameter is presumably a peak derived from the pore diameter of the wall portion of the honeycomb member.

Existence of a plurality of peaks in the pore distribution curve of the wall portion of the honeycomb member indicates co-existence of large pores and small pores in the wall portion of the honeycomb member.

Existence of the large pores tends to enable capturing of PM without increasing the pressure loss.

Further, small pores tend to contribute to conversion of the toxic components such as CO, HC, and NOx, since the small pores are formed by supporting the catalyst containing the catalyst component thereon.

When the pore distribution of a conventional honeycomb structure including the porous ceramic is measured in the same manner with about 100 g/L or more of the catalyst supported thereon, the obtained pore distribution curve has a flat shape. This may presumably indicate that there are fewer pores having a pore diameter suitable for capturing PM.

Following will discuss a method for producing the honeycomb structure of the present embodiment.

First, alumina fibers, glass fibers, an organic binder, a plasticizer, a lubricant, and water are mixed, and sufficiently stirred to prepare a mixture mainly including inorganic fibers.

Next, the mixture is charged into a cylinder from a mixture tank of a plunger-type extrusion-molding machine, and the piston is pressed toward a round pillar-shaped die side so that the mixture is extruded through the round pillar-shaped die to produce a round pillar-shaped elongated honeycomb molded body with a plurality of cells (through holes) longitudinally placed in parallel with one another with a wall portion therebetween.

Subsequently, the elongated honeycomb molded body is cut into a predetermined length by using a cutting apparatus having a cutting disc as its cutting member, and thereafter, the resulting honeycomb molded body is dried at the temperature in the range of at least about 100° C. and at most about 200° C. for at least about 5 minutes and at most about 60 minutes under normal atmosphere by using a microwave drying apparatus and a hot-air drying apparatus.

Next, the dried honeycomb molded body is degreased in a degreasing furnace at the temperature in the range of at least about 200° C. and at most about 600° C. for at least about 1 hour and at most about 5 hours under normal atmosphere, and then, fired in a firing furnace at the temperature in the range of at least about 900° C. and at most about 1050° C.

Further, the resulting honeycomb molded body is immersed into a hydrochloric acid solution of at least about 1 mol/l and at most about 10 mol/l for at least about 0.5 hours and at most about 24 hours so that an acid treatment is carried out thereon, and this is again fired at the temperature in the range of at least about 900° C. and at most about 1050° C. to produce a honeycomb member having cells.

Subsequently, a plug material paste including an inorganic binder, an organic binder, and at least one of inorganic fibers and inorganic particles is prepared.

Then, predetermined cells of the honeycomb member are filled with the plug material paste so that the cells are sealed at either one end. The plug material paste is dried and solidified using a drying apparatus to form the plug.

By using the above method, the honeycomb member having the cells sealed at either one end with the plug can be produced.

Then, the catalyst is supported on the wall portion of the honeycomb member.

As a method to support the catalyst on the wall portion of the honeycomb member, there may be employed a method in which the honeycomb member is immersed in a slurry containing a catalyst, removed therefrom, and then fired.

More specifically, the honeycomb member is immersed in an alumina slurry containing γ-alumina particles. Then, the immersed honeycomb member is dried at the temperature in the range of at least about 110° C. and at most about 200° C. for approximately 2 hours. The dried honeycomb member is heated and fired at the temperature in the range of at least about 500° C. and at most about 1000° C. to form an layer (catalyst support layer) including γ-alumina on the wall portion of the honeycomb member.

Further, the honeycomb member is raised so that the longitudinal direction thereof becomes a vertical direction. Then, the honeycomb member is immersed in a catalyst solution containing barium and potassium, and the immersed honeycomb member is dried. The dried honeycomb member is heated and fired at the temperature in the range of at least about 500° C. and at most about 800° C. in an inert atmosphere so that the catalyst supporting layer supports the catalyst component thereon.

An exhaust gas purifying (converting) apparatus according to one embodiment using the honeycomb structure of the present embodiment will be described in the following.

Figure 5:
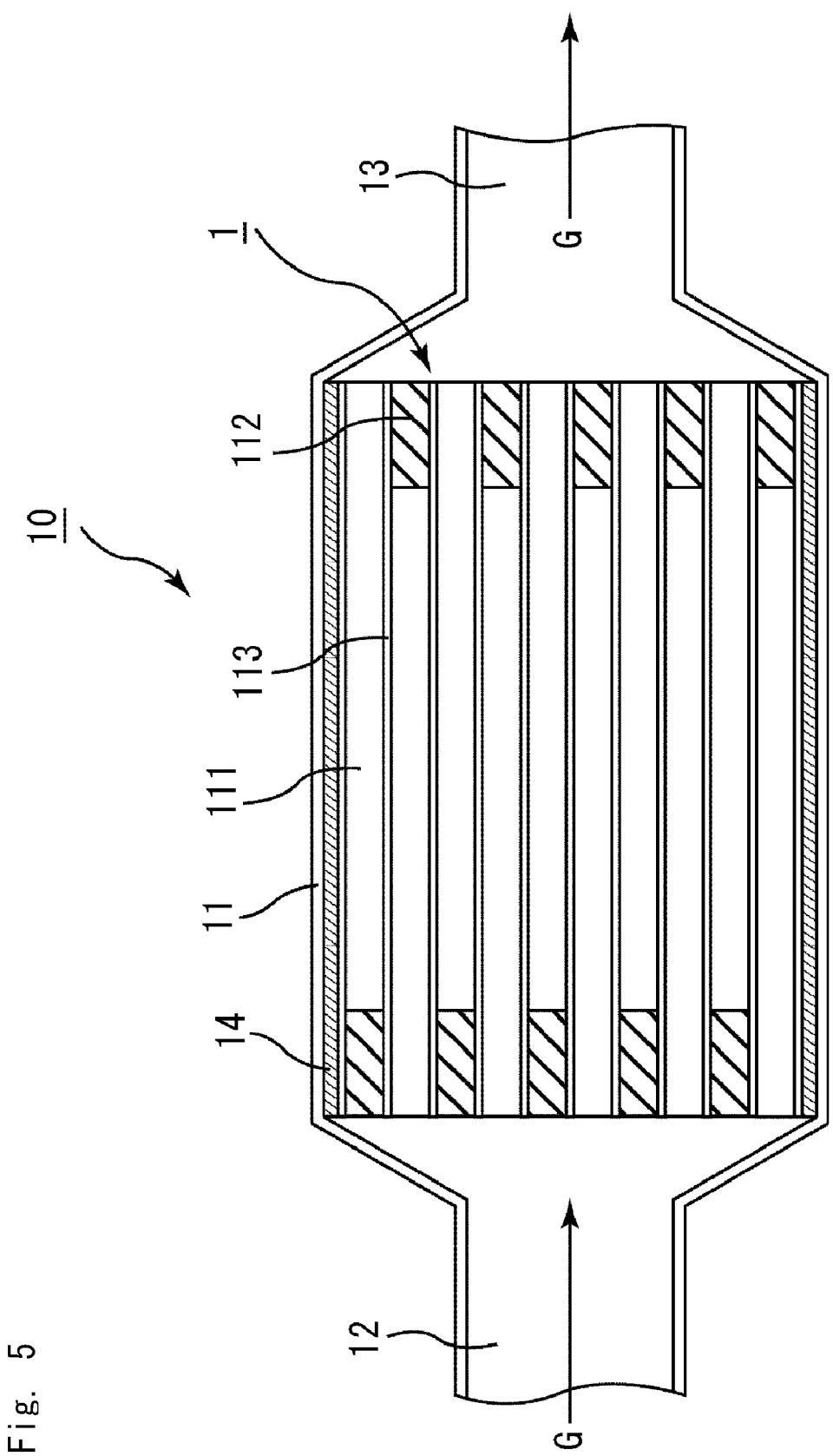
FIG. 5 is a cross-sectional view schematically showing an exhaust gas purifying (converting) apparatus according to one embodiment using the honeycomb structure of the present embodiment.

FIG. 5 is a cross-sectional view schematically showing an exhaust gas purifying (converting) apparatus according to the embodiment using the honeycomb structure of the present embodiment.

An exhaust gas purifying (converting) apparatus 10 shown in FIG. 5 is provided with a honeycomb structure 1 of the present embodiment mounted in a metal casing 11 serving as the passage of exhaust gases G. Out of both end portions of the metal casing 11, an introducing pipe (inlet pipe) 12 is connected to the metal casing 11 to one end portion through which the exhaust gases G discharged from an internal combustion engines such as an engine is introduced and an exhaust pipe 13 through which the exhaust gases G are discharged outside is connected to the other end portion of the metal casing 11. In FIG. 5, the arrows indicate the flow of the exhaust gases G.

The honeycomb structure 1 is mounted in the metal casing 11 in a state where a peripheral portion of the honeycomb structure 1 wrapped with a holding sealing material 14.

In the exhaust gas purifying (converting) apparatus 10 having the above structure, the exhaust gases G (containing toxic components and PM) discharged from an internal combustion engine such as an engine are introduced into the metal casing 11 through the introducing pipe 12.

Then, the exhaust gases G flow into the honeycomb structure 1. When the exhaust gases G passes through the honeycomb structure 1, PM is captured (filtered) in a cell 111 and a wall portion 113.

The catalyst (barium and potassium) supported on the wall portion 113 serves to convert NOx in the exhaust gases G.

Then, the exhaust gases G are discharged outside through the exhaust pipe 13.

Effects of the honeycomb structure of the present embodiment will be listed below.

(1) The honeycomb member constituting the honeycomb structure of the present embodiment mainly includes inorganic fibers integrally molded. Therefore, the honeycomb structure having a high strength even with a high porosity tends to be obtained.

(2) Since the cells of the honeycomb structure are sealed at either one end, the amount of the catalyst remaining in the wall portion before firing tends to be increased, so that the honeycomb structure tends to support the catalyst as much as at least about 100 g/L ad at most about 400 g/L thereon. Accordingly, a honeycomb structure having the excellent converting performance of CH, HC, NOx and the like tends to be obtained.

(3) The honeycomb structure of the present embodiment presents a pore distribution curve having three peaks. This may presumably indicate that the honeycomb structure has a pore diameter distribution controlled in the preferable range.

Pores having pore diameters in the ranges of at least about 15 μm and at most about 50 μm and of at least about 1 μm and at most about 15 μm tend to serve to keep the low pressure loss and to improve capture efficiency of PM.

The pores having a pore diameter in the range of at least about 0.005 μm and at most about 0.03 μm tend to serve to convert toxic components (CO, HC, NOx, and the like).

(4) The honeycomb structure of the present embodiment contains an inorganic material, and the inorganic fibers are firmly fixed by the inorganic material. The inorganic material exists locally at the intersection of inorganic fibers or in the vicinity thereof.

With the inorganic fibers firmly fixed by the inorganic material, it may become easier to prevent the untangled inorganic fibers, and thus, it may become easier to increase the strength of the honeycomb structure.

EXAMPLES

The following description will discuss the first embodiment of the present invention in more detail by Examples. However, the present invention is not limited only to these Examples.

Example 1

(1) Producing of Honeycomb Member
(1-1) Mixing Process

First, 12.3 parts by weight of alumina fibers (average fiber length: 0.3 mm, average fiber diameter: 5 μm) including 72% of alumina and 28% of silica, 6.2 parts by weight of glass fibers (average fiber diameter: 9 μm, average fiber length: 3 mm), 11.7 parts by weight of an organic binder (methyl cellulose), 7.1 parts by weight of a pore-forming agent (acrylic resin), 8.1 parts by weight of a plasticizer (UNILUB, made by NOF Corporation), 3.8 parts by weight of a lubricant (glycerin) and 50.9 parts by weight of water were mixed, and sufficiently stirred to prepare a mixture.

(1-2) Extrusion-Molding Process

The mixture, obtained in process (1-1), was charged into a cylinder from a mixture tank of a plunger-type extrusion-molding machine, and the piston is pressed toward the die side so that the mixture was extruded through the die to produce an elongated round pillar-shaped honeycomb molded body with cells.

(1-3) Cutting Process

The elongated round pillar-shaped honeycomb molded body, obtained in process (1-2), was cut by using a cutting apparatus having a cutting disc as its cutting member. Thus, a honeycomb molded body was obtained.

(1-4) Drying Process

The round pillar-shaped honeycomb molded body, obtained in process (1-3), was dried at 200° C. for three hours under normal atmosphere by using a microwave drying apparatus and a hot-air drying apparatus, so that moisture contained in the honeycomb molded body was removed.

(1-5) Degreasing Process

The round pillar-shaped honeycomb molded body, obtained in process (1-4), underwent a heating treatment at 400° C. for three hours in an electric furnace under normal atmosphere, so that organic substances contained in the honeycomb molded body were removed.

(1-6) Firing Treatment and Acid Treatment

The round pillar-shaped honeycomb molded body, obtained in process (1-5), underwent a firing treatment at 950° C. for five hours in a firing furnace under normal atmosphere.

Thereafter, the resulting honeycomb molded body was immersed into a HCl solution of 4 mol/l at 90° C. for one hour so that an acid treatment is carried out thereon, and this again underwent a firing treatment at 1050° C. for five hours to produce a honeycomb member having an outer diameter of 160 mmϕ×60 mm, having a thickness of the wall portion of 16 mil (0.4 mm), and having cell density of 200 cpsi (31 pcs/cm$^2$).

(1-7) Sealing Process

A heat-resistant plug material paste containing 30% by weight of alumina fibers having an average fiber length of 20 μm, 21% by weight of silicon carbide particles having an average particle diameter of 0.6 μm, 15% by weight of silica sol, 5.6% by weight of carboxymethylcellulose, and 28.4% by weight of water was prepared.

Then, predetermined cells of the honeycomb member obtained in the above (1-6) were filled with the plug material paste and the honeycomb member was again dried by using the drying apparatus.

In the above process, a honeycomb member mainly including inorganic fibers and having cells sealed at either one end was produced.

The porosity of the wall portion of the honeycomb member measured by the gravimetric method was 85%.

(2) Supporting of Catalyst (2-1) Formation of Catalyst Supporting Layer

An alumina slurry was prepared by mixing and stirring γ-alumina particles having an average particle diameter of 0.8 μm and a sufficient amount of water. The honeycomb member was raised so that the longitudinal direction thereof would become a vertical direction. Then, the honeycomb member was immersed in the alumina slurry and maintained in this state for one minute.

Then, the honeycomb member was removed from the alumina slurry with the γ-alumina particles remaining in the wall portion. The drying was carried out on the honeycomb member by heating at 110° C. for one hour, and the firing was further carried out thereon by firing at 700° C. for one hour, so that the catalyst supporting layer including γ-alumina was formed.

(2-2) Supporting of Catalyst Component

The honeycomb member was raised so that the longitudinal direction thereof would become a vertical direction. Then, the honeycomb member was immersed in a catalyst solution containing barium and potassium (an acetic acid aqueous solution of barium carbonate and potassium carbonate containing 0.5 mol/L of barium and 0.5 mol/L of potassium) and maintained in this state for one minute.

Then, the honeycomb member was dried at 110° C. for two hours and fired at 500° C. for one hour in a nitrogen atmosphere, so that the catalyst component containing barium and potassium was further supported on the catalyst supporting layer.

The amount of the supported catalyst was controlled so that the amount of the supported γ-alumina becomes 60 g per liter of volume of the honeycomb structure (60 g/L), and the catalyst component was supported in an amount of 60 g/L.

Here, the amount of the supported catalyst was controlled by repeating the immersing in the alumina slurry and the catalyst solution, the drying, and the firing.

The weight of the catalyst component was a total weight of barium and potassium.

By following the above process, a honeycomb structure including the honeycomb member supporting 120 g/L of the catalyst containing γ-alumina, barium, and potassium thereon was produced.

(2-3) Supporting of Noble Metal

The above honeycomb structure was immersed in a diammine dinitro platinum nitric acid ([Pt(NH$_3$)$_2$(NO$_2$)$_2$]HNO$_3$, platinum concentration of 3.6% by weight) and maintained in this state for one minute.

Then, the honeycomb structure was dried at 110° C. for two hours and fired at 700° C. for one hour in a nitrogen atmosphere, so that 3 g/L of platinum catalyst was supported on the honeycomb structure.

Hence, a total amount of the catalyst supported on the honeycomb structure produced in the present embodiment was 123 g/L.

Example 2

A honeycomb structure was produced in the same manner as in Example 1 except that the amount of the supported catalyst was changed to 243 g/L (120 g/L of alumina, a total amount of 120 g/L of barium and potassium, and 3 g/L of platinum).

Example 3

A honeycomb structure was produced in the same manner as in Example 1 except that the amount of the catalyst supported on the honeycomb structure was 363 g/L (180 g/L of alumina, a total amount of 180 g/L of barium and potassium, and 3 g/L of platinum).

Comparative Example 1

A honeycomb structure was produced in the same manner as in Example 1 except that the amount of the supported catalyst was changed to 83 g/L (40 g/L of alumina, a total amount of 40 g/L of barium and potassium, and 3 g/L of platinum).

Comparative Example 2

A honeycomb structure was produced in the same manner as in Example 1 except that the amount of the supported catalyst was changed to 483 g/L (240 g/L of alumina, a total amount of 240 g/L of barium and potassium, and 3 g/L of platinum).

Comparative Example 3

A honeycomb structure including a porous ceramic mainly including silicon carbide was produced and 123 g/L of catalyst (60 g/L of alumina, a total amount of 60 g/L of barium and potassium, and 3 g/L of platinum) was supported on the wall portion in the same manner as in Example 1, thereby the honeycomb structure supporting the catalyst thereon was produced.

The honeycomb structure including a porous ceramic mainly including silicon carbide was produced as follows.

An amount of 52.8% by weight of coarse powder of silicon carbide having an average particle diameter of 22 μm and 22.6% by weight of fine powder of silicon carbide having an average particle diameter of 0.5 μm were mixed. To the resulting mixture, 2.1% by weight of acrylic resin, 4.6% by weight of an organic binder (methylcellulose), 2.8% by weight of a lubricant (UNILUB, made by NOF Corporation), 1.3% by weight of glycerin, and 13.8% by weight of water were added, and then kneaded to prepare a mixed composition. The mixed composition was extrusion molded so that a raw honeycomb molded body with no cells being sealed was produced.

Then, the raw honeycomb molded body was dried by using a microwave drying apparatus to obtain a dried body of the honeycomb molded body. Thereafter, a paste having the same composition as the raw molded body was filled into predetermined cells, and then the honeycomb molded body was again dried by a drying apparatus.

The dried honeycomb molded body was degreased at 400° C., and then fired at 2200° C. under normal pressure with argon atmosphere for three hours so as to produce a honeycomb structure including a silicon carbide sintered body.

Here, the honeycomb structure including the silicon carbide sintered body had the same outer diameter and the same cell dimension as those in Example 1.

The porosity of the honeycomb structure was measured and was 45%.

The following measurement was conducted on the honeycomb structures produced in the above Examples and Comparative Examples.

(Pore Distribution Measurement)

A part of the wall portion of the honeycomb structure was cut out into an approximately one-centimeter cube and its pore distribution in a range of 0.1 to 600 μm of the pore diameter was measured by using a porosimeter (Autopore III 9420, produced by Shimadzu Corp.) which adopts a mercury porosimetry. A pore distribution curve was drawn by plotting the pore diameter (μm) on the X-axis and the log differential pore volume (mL/g) on the Y-axis.

Table 1 collectively shows the presence or absence of peaks in the range of 0.005 to 0.03 μm of the pore diameter (Peak1), in the range of 1 to 15 μm of the pore diameter (Peak2), and in the range of 15 to 50 μm of the pore diameter (Peak3).

(Measurement of NOx Converting Efficiency)

Figure 6:
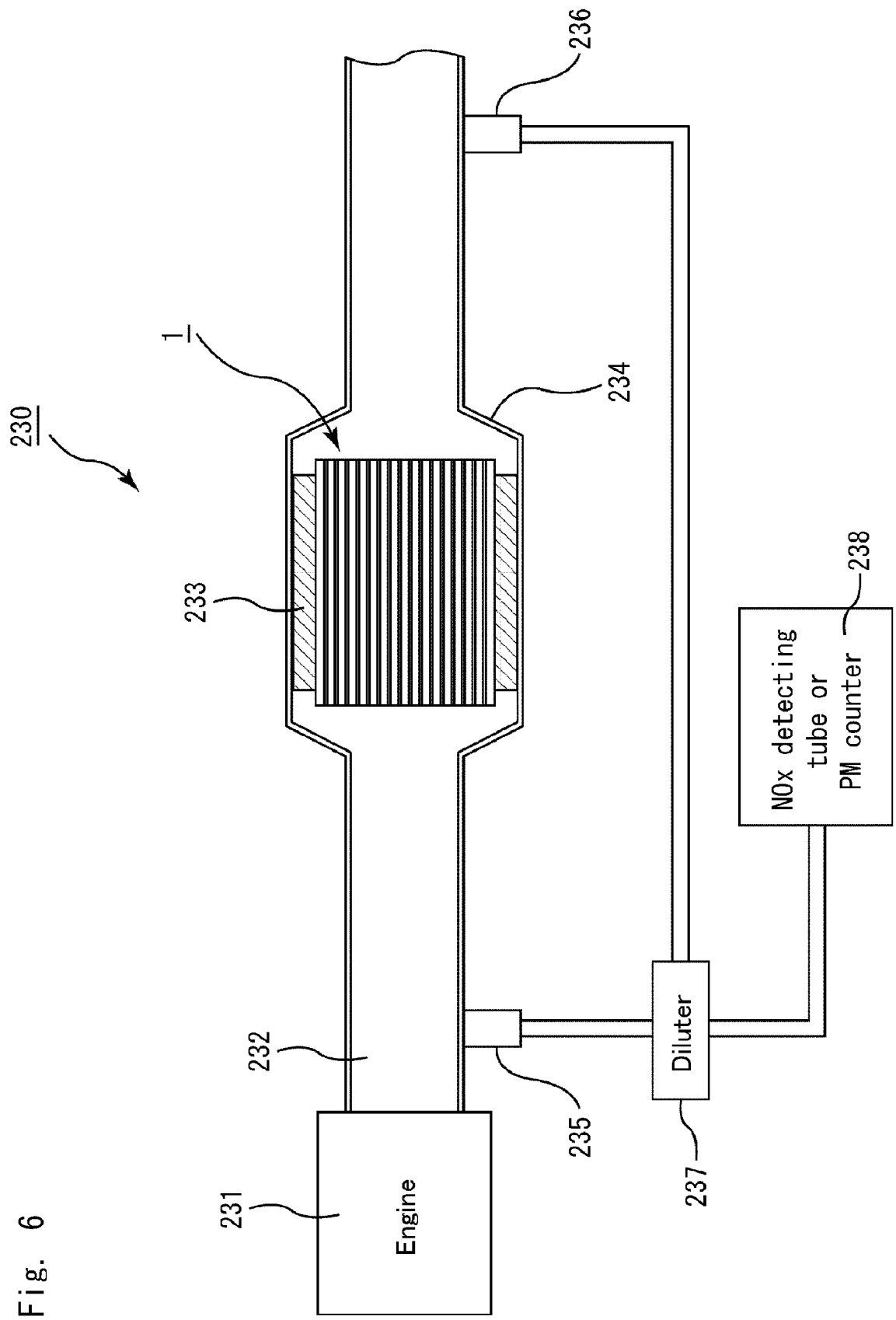
FIG. 6 is an explanatory view of a NOx converting efficiency measuring apparatus and a measuring apparatus of capture efficiency of PM.

Measurement of NOx converting efficiency was carried out by using a NOx converting efficiency measuring apparatus 230 as shown in FIG. 6. FIG. 6 is an explanatory view of the NOx converting efficiency measuring apparatus and a measuring apparatus of capture efficiency of PM.

The NOx converting efficiency measuring apparatus 230 includes a 2L (liter) common-rail-type diesel engine 231, an exhaust gas pipe 232 that allows exhaust gas discharged from the engine 231 to flow therein, a metal casing 234 connected to the exhaust gas pipe 232 and fixing the honeycomb structure 1 wrapped with an alumina mat 233 therein, a sampler 235 that samples exhaust gases prior to flowing through the honeycomb structure 1, a sampler 236 that samples the exhaust gases after flowing through the honeycomb structure 1, a diluter 237 for diluting the exhaust gases sampled by the samplers 235 and 236, and a NOx detecting tube 238 for measuring the concentration of NOx contained in the diluted exhaust gas.

Next, measurement procedures are described. The engine was activated and after the temperature of the exhaust gases was stabilized at 250° C., the engine was driven defining that the lean operation for 55 seconds and the rich spike operation for five seconds as one cycle.

The NOx concentration No of the exhaust gases before flowing through the honeycomb structure 1 and the NOx concentration $N_1$ of the exhaust gases after flowing through the honeycomb structure 1 were monitored by using the NOx detecting tube 238 during the above five-minute operation. The NOx concentrations during the entire operation time (five minutes) were integrated. The difference was applied to the following equation to measure the NOx converting efficiency:

$$\text{NOx converting efficiency (\%)} = [(N_0 - N_1)/N_0] \times 100.$$

Table 1 collectively shows the measurement results of the NOx converting efficiency in the above Examples and Comparative Examples.

(Measurement of Capture Efficiency of PM)

The capture efficiency of PM was measured by using a capture-efficiency-of-PM measuring apparatus 230 having the same structure as the NOx converting efficiency measuring apparatus 230 shown in FIG. 6 except that the NOx detecting tube 238 was replaced with a PM counter 238.

The above apparatus was constituted as a scanning mobility particle sizer (SMPS) provided with the PM counter 238 (agglomerated particle counter 3022A-S, produced by TSI Inc.) for measuring the quantity of PM.

The capture efficiency of PM was measured by monitoring a quantity $P_0$ of PM in the exhaust gases before flowing through the honeycomb structure 1 and a quantity $P_1$ of PM in the exhaust gases after flowing through the honeycomb structure 1 by using the PM counter 238 instead of monitoring the concentrations $NO_0$ and $NO_1$ of NOx in the measurement of the NOx converting efficiency. The following equation was used to calculate the capture efficiency of PM:

$$\text{Capture efficiency of } PM\,(\%) = [(P_0 - P_1)/P_0] \times 100.$$

Table 1 collectively shows the measurement results of the capture efficiency of PM in the above Examples and Comparative Examples.

(Measurement of Pressure Loss)

Figure 7:
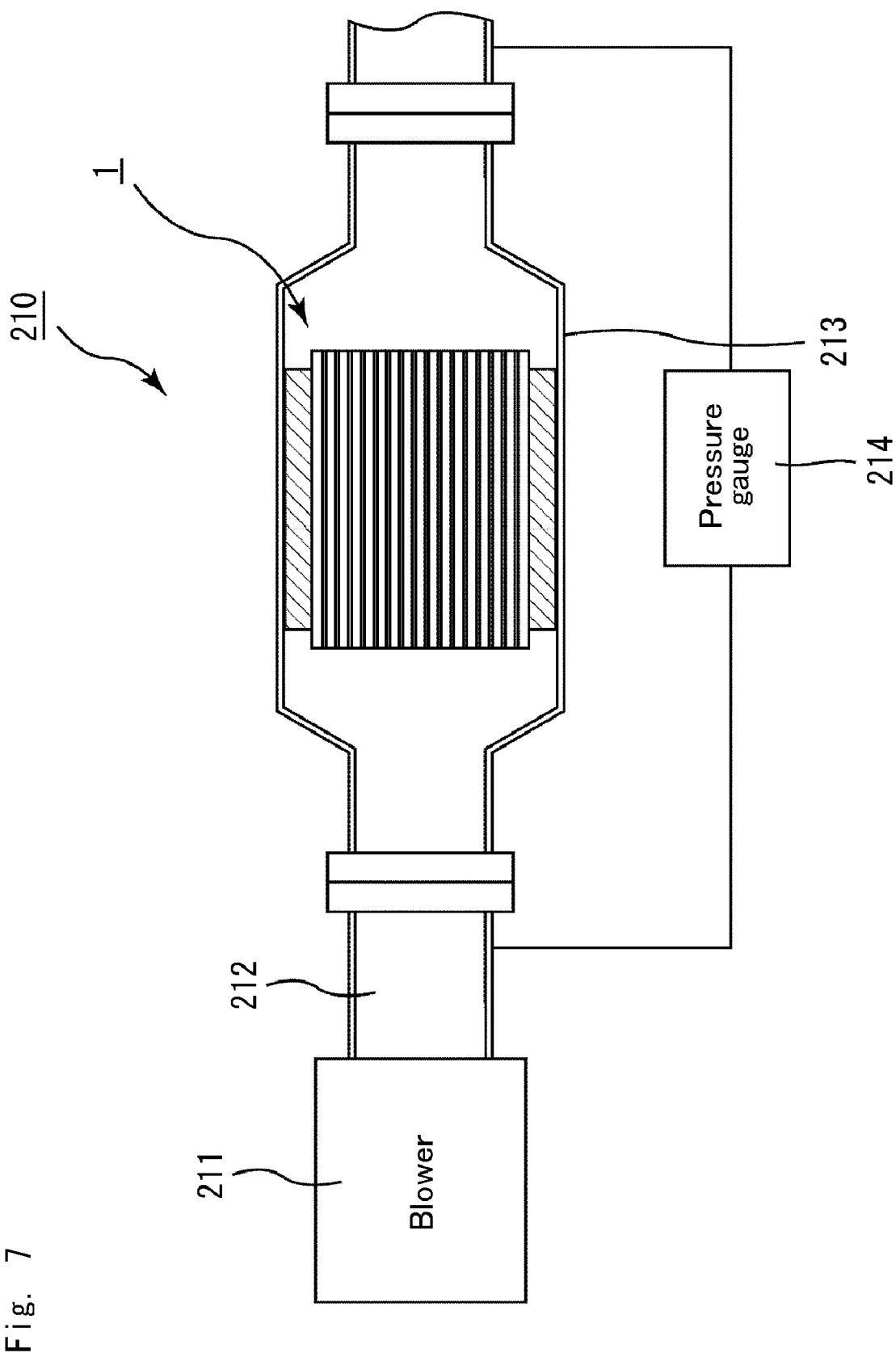
FIG. 7 is an explanatory view of a pressure loss measuring apparatus.

The pressure loss was measured using a pressure loss measuring apparatus as shown in FIG. 7.

A pressure loss measuring apparatus 210 has a structure in which a honeycomb structure 1 fixed in a metal casing 213 is placed in an exhaust gas pipe 212 of a blower 211, and a pressure gauge 214 is attached so as to be able to detect pressures before and after the honeycomb structure 1.

The blower 211 was driven so that the flow rate of exhaust gases was set to 400 m³/h, and a pressure difference (pressure loss) was measured after five minutes from the start of the driving operation.

Table 1 collectively shows the measurement results of the pressure loss in the above Examples and Comparative Examples.

TABLE

| | Honeycomb structure | | | | | Evaluation result | | |
|---|---|---|---|---|---|---|---|---|
| | Main component | Amount of supported catalyst (g/L) | Pore distribution measurement | | | NOx converting efficiency (%) | Capture efficiency of PM (%) | Pressure loss (kPa) |
| | | | Peak 1 | Peak 2 | Peak 3 | | | |
| Example 1 | Inorganic fiber | 123 | Presence | Presence | Presence | 75 | 90 | 4.0 |
| Example 2 | Inorganic fiber | 243 | Presence | Presence | Presence | 82 | 93 | 4.8 |
| Example 3 | Inorganic fiber | 363 | Presence | Presence | Presence | 80 | 95 | 5.4 |
| Comparative Example 1 | Inorganic fiber | 83 | Presence | Presence | Presence | 67 | 85 | 3.6 |

TABLE-continued

| | Honeycomb structure | | | | | Evaluation result | | |
|---|---|---|---|---|---|---|---|---|
| | Main component | Amount of supported catalyst (g/L) | Pore distribution measurement | | | NOx converting efficiency (%) | Capture efficiency of PM (%) | Pressure loss (kPa) |
| | | | Peak 1 | Peak 2 | Peak 3 | | | |
| Comparative Example 2 | Inorganic fiber | 483 | Presence | Presence | Absence | 70 | 98 | 7.8 |
| Comparative Example 3 | Silicon carbide | 123 | Presence | Presence | Absence | 64 | 100 | 12.1 |

The results in Table 1 shows that each of the honeycomb structures supporting at least about 100 g/L and at most about 400 g/L of catalyst thereon and presenting three peaks in the pore distribution measurement, as produced in Examples 1 to 3, had high NOx converting efficiency, high capture efficiency of PM and low pressure loss.

The honeycomb structure produced in Comparative Example 1 may presumably have had low NOx converting efficiency and low capture efficiency of PM, since the amount of the catalyst supported on the honeycomb structure was as small as less than about 100 g/L.

Further, the honeycomb structure produced in Comparative Example 2 may presumably have had high pressure loss, since the amount of the catalyst supported on the honeycomb structure was as large as more than about 400 g/L.

Furthermore, the honeycomb structure produced in Comparative Example 3 had high pressure loss when supporting 123 g/L of catalyst, since the honeycomb structure included a porous ceramic mainly including silicon carbide and the porosity thereof was low.

Second Embodiment

The following will discuss about the second embodiment, which is one embodiment of the present invention.

The honeycomb structure of the present embodiment has the same structure as the honeycomb structure of the first embodiment except that a plurality of honeycomb members are bonded together with an adhesive layer interposed therebetween.

Figure 8:
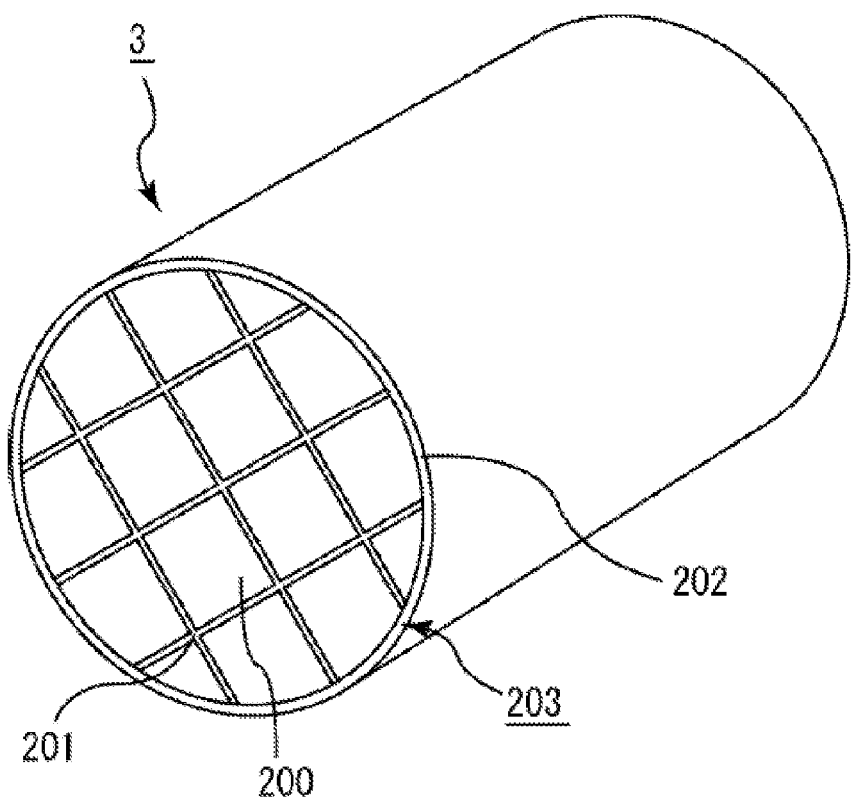
FIG. 8 is a perspective view schematically showing another example of a honeycomb structure according to one embodiment of the present invention.

FIG. 8 is a perspective view schematically showing another example of the honeycomb structure according to the embodiment of the present invention.

Figure 9A:
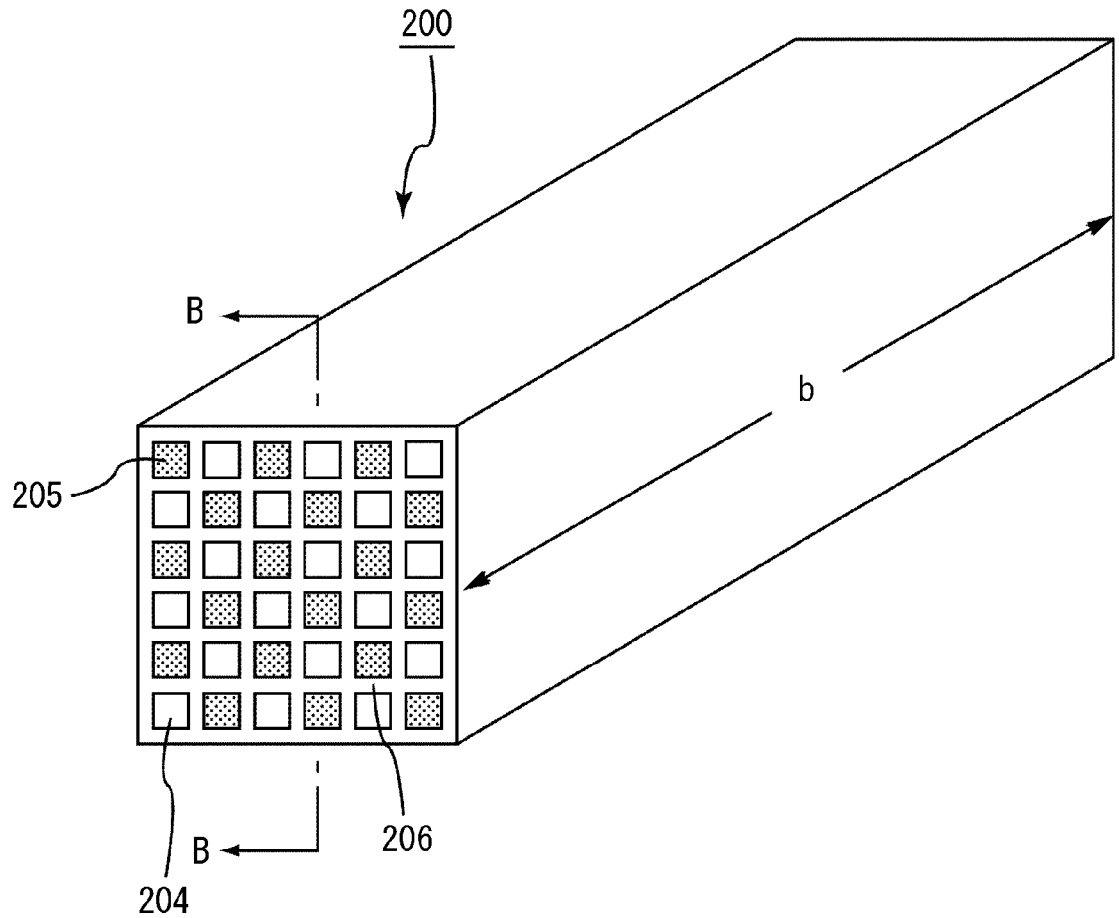
FIG. 9A is a perspective view schematically showing one example of a honeycomb member constituting a honeycomb structure according to the embodiment of the present invention.
Figure 9B:
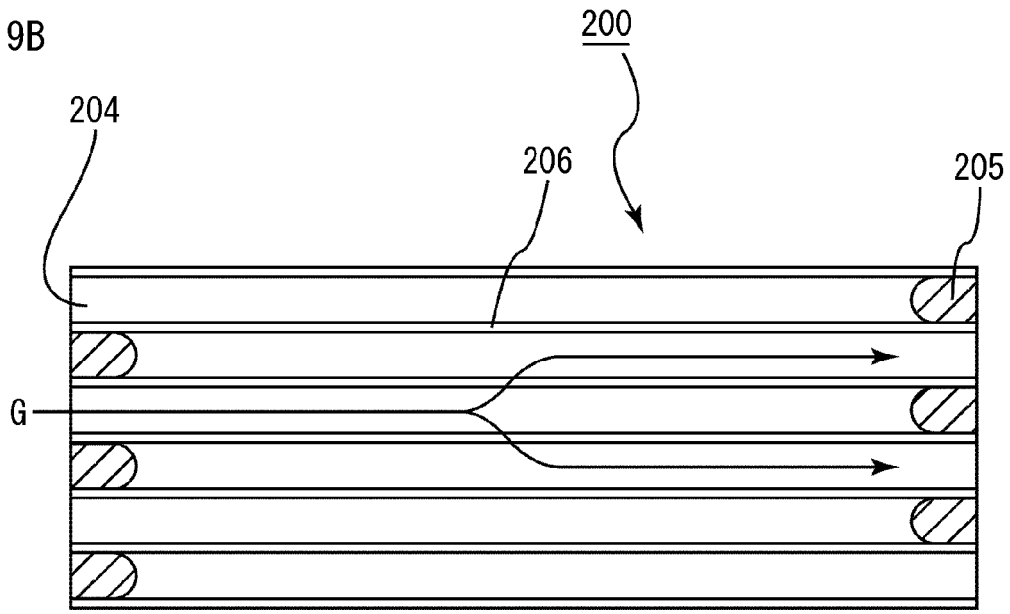
FIG. 9B is a B-B line cross-sectional view of the honeycomb member shown in FIG. 9A.

FIG. 9A is a perspective view schematically showing an example of the honeycomb member constituting the honeycomb structure according to the embodiment of the present invention and FIG. 9B is a B-B line cross-sectional view of the honeycomb member shown in FIG. 9A.

In a honeycomb structure 3 shown in FIG. 8, a plurality of honeycomb members 200 mainly including inorganic fibers are bonded together with an adhesive layer 201 interposed therebetween to form a honeycomb block 203 and a sealing material layer 202 is further formed on a peripheral face of the honeycomb block 203.

The honeycomb member 200 shown in FIG. 9A and FIG. 9B has the same structure as the honeycomb member 100 shown in FIG. 1 except that the honeycomb member 200 has a rectangular pillar shape.

The honeycomb member 200 has a large number of cells 204 longitudinally (the direction "b" in FIG. 9A) disposed in parallel with one another with a wall portion 206 interposed therebetween. Each of the cells 204 is sealed at either one end with a plug 205. Therefore, the exhaust gases G flowing into one cell 204 with an opening at one end face are to be discharged from another cell 204 with an opening on the other end face after surely passing through the wall portion 206 between the cells 204. Accordingly, the wall portion 204 serves as a filter for capturing PM.

The adhesive layer is formed by drying and solidifying a paste including an inorganic binder, an organic binder, and at least one of inorganic fibers and inorganic particles, in the same manner as the plug described in the first embodiment. Further, the sealing material layer is also formed by using the same material as that for the adhesive layer.

The catalyst in an amount of at least about 100 g and at most about 400 g per liter of volume of the honeycomb structure is supported on the honeycomb structure of the present embodiment, in the same manner as the honeycomb structure of the first embodiment. The wall portion of the honeycomb member presents a pore distribution curve having three peaks as the wall portion in the first embodiment.

The same kind of catalyst as the catalyst in the first embodiment is supported.

The method for producing the honeycomb structure of the present embodiment will be described in the following.

First, a rectangular pillar-shaped elongated honeycomb molded body with a plurality of cells longitudinally disposed in parallel with one another with a wall portion therebetween is produced in the same manner as the honeycomb structure of the first embodiment except that the shape of the die is changed.

Then, the cutting, drying, firing and acid treatment is carried out in the same manner as in the first embodiment to produce a rectangular pillar-shaped honeycomb member having cells. The cells are each sealed with a plug at either one end.

Next, a catalyst is supported on the wall portion of the rectangular pillar-shaped honeycomb member having the cells partially sealed.

A method for supporting the catalyst is the same as that in the first embodiment.

Then, a sealing material paste including an inorganic binder, an organic binder, and at least one of inorganic fibers and inorganic particles is prepared. The same paste as the above described plug material paste may be used as the sealing material paste.

By repeating the application of the sealing material paste to be an adhesive layer to a side face of the honeycomb member supporting the catalyst thereon to form a sealing material paste layer and placing another honeycomb member on the sealing material paste layer, an aggregated body of the honeycomb members, which has a predetermined number of honeycomb members bonded together, is produced.

Then, the aggregated body of the honeycomb members is heated to dry and solidify the sealing material paste layer so as to form an adhesive layer, whereby a rectangular pillar-shaped honeycomb block is produced.

The cutting is carried out to a periphery of the honeycomb block by using a diamond cutter to form a round pillar-shaped honeycomb block.

Further, where necessary, the sealing material paste is applied to the peripheral face of the round pillar-shaped honeycomb block and the sealing material paste is dried and solidified to form a sealing material layer.

By conducting the above process, the producing of the honeycomb structure is completed.

The honeycomb structure of the present embodiment can also exert the effects (1) to (4) described in the first embodiment.

Other Embodiments

Each of the honeycomb structures according to the embodiments of the present invention in the above described embodiments ensures excellent NOx converting performance. By changing the kind of the catalyst component to be supported on the honeycomb structure, a honeycomb structure ensuring excellent CO, HC, Sox or the like converting performance can be obtained.

For example, by supporting a catalyst for oxidizing SOx and a sulfur sorbent (for example MgO) for absorbing the oxidized SOx, a honeycomb structure ensuring excellent SOx converting performance can be obtained.

Furthermore, by supporting a noble metal, a honeycomb structure ensuring excellent CO, HC and the like converting performance can be obtained. Further, the honeycomb structure supporting the noble metal tends to lower the combustion temperature of PM during the regenerating.

Desirable noble metals include platinum (Pt), palladium (Pd), rhodium (Rh) and the like. Among them, platinum is more desirable.

Each of the catalyst component for converting NOx, the catalyst component for converting SOx, and the catalyst component for converting CO, HC and the like may be used alone or two or more kinds of these may be used in combination to obtain a honeycomb structure converting a plurality of kinds of toxic components.

The cross-sectional shape of the honeycomb structure, which is perpendicular to the longitudinal direction, is not particularly limited to a round shape, and various shapes such as a rectangular shape may be used; however, it is preferable to use a shape enclosed only by a curved line or by curved lines and straight lines.

In addition to a round shape, specific examples thereof include a cylindroid shape, an elongated round shape, racetrack shape, a shape in which one portion of a simple closed curved line such as a cylindroid shape or an elongated round shape has a recess portion (concave shape), and the like.

With respect to the material of inorganic fibers constituting the honeycomb structure, examples thereof include: oxide ceramics such as silica-alumina, mullite, alumina, silica, titania and zirconia; nitride ceramics such as silicon nitride and boron nitride; carbide ceramics such as silicon carbide; basalt, and the like. Each of these may be used alone or two or more kinds of these may be used in combination.

Out of these, at least one kind selected from the group consisting of silicon carbide, alumina, basalt, silica, silica-alumina, titania and zirconia is preferably used.

Thus, the honeycomb structure using these materials exerts a superior heat resistance.

With respect to the inorganic material constituting the honeycomb structure, for example, those materials which are melted at a temperature at which the inorganic fibers are not melted or sublimated may be used. Moreover, those materials which are melted at a temperature lower than the heat-resistant temperature of the inorganic fibers are preferably used as the inorganic material.

With respect to the inorganic material, those containing silica are preferably used, and specific examples thereof include inorganic glass such as silicate glass, silicate alkali glass, borosilicate glass, and the like.

Moreover, in the honeycomb structure, the inorganic material is preferably melted and solidified to fix the intersection between the inorganic fibers or the vicinity thereof.

By allowing the inorganic material to be melted and solidified to fix the inorganic fibers to one another, the bond strength between the inorganic fibers becomes higher, and it becomes possible to further prevent untangled inorganic fibers, and consequently to further improve the strength of the honeycomb structure.

The tensile strength of the honeycomb structure is preferably about 0.3 MPa or more, more preferably, about 0.4 MPa or more.

The tensile strength of about 0.3 MPa or more tends to provide sufficient reliability in the case that the honeycomb structure is used as the DPF.

Here, the tensile strength can be measured by measuring the honeycomb member formed into a sheet shape with the two ends thereof fixed by jigs by using an INSTRON type universal tensile meter.

With respect to the fiber length of the inorganic fibers, a preferable lower limit value is about 0.1 mm, more preferably, about 0.5 mm. Further, a preferable upper limit value is about 50 mm, more preferably, about 20 mm.

The fiber length of about 0.1 mm or more tends to make it easier to firmly fix the inorganic fibers to one another by interposing an inorganic material, and to provide sufficient strength; in contrast, the fiber length of about 50 mm or less tends to make it easier to produce a homogeneous honeycomb member and to provide a honeycomb structure having sufficient strength.

With respect to the fiber diameter of the inorganic fibers, a preferable lower limit value is about 0.3 μm, and a preferable upper limit value is about 30 μm.

The fiber diameter of about 0.3 μm or more tends not to cause the inorganic fiber to be easily broken, with the result that the obtained honeycomb structure tends not to become vulnerable to wind erosion; in contrast, the fiber diameter of about 30 μm or less tends to make it easier for inorganic fibers to be firmly fixed to one another by interposing an inorganic material, and to provide sufficient strength. The more preferable lower limit value of the fiber diameter is about 0.5 μm, and the more preferable upper limit value thereof is about 15 μm.

With respect to the apparent density of the honeycomb structure, a preferable lower limit value is about 0.04 g/cm$^3$ and a preferable upper limit value is about 0.4 g/cm$^3$.

Moreover, in the honeycomb structure, the distance between adjacent cells (that is, the thickness of the wall portion) is preferably about 0.2 mm or more. The distance of about 0.2 mm or more tends not to cause degradation in the strength of the honeycomb member.

Here, with respect to the distance between adjacent cells (the thickness of the wall portion), a preferable upper limit is about 1.0 mm. When the wall portion is about 1.0 mm or less, the pressure loss tends not to be increased.

In the honeycomb structure, with respect to the density of the cells on a plane perpendicular to the forming direction of the cells, not particularly limited, a preferable lower limit is about 15.5 pcs/cm² (about 100 pcs/in²), and a preferable upper limit is about 93.0 pcs/cm² (about 600 pcs/in²). A more preferable lower limit is about 23.3 pcs/cm² (about 150 pcs/in²), and a more preferable upper limit is about 77.5 pcs/cm² (about 500 pcs/in²).

Here, the shape of the above-mentioned cells in a plan view is not particularly limited to a square shape, and any desired shape such as a triangular shape, a hexagonal shape, an octagonal shape, a dodecagonal shape, a round shape, an elliptical shape and a star shape may be used.

In the honeycomb structure according to the embodiments of the present invention, the plug material paste used for forming the plug and the sealing material paste used for forming the adhesive layer and the sealing material layer may have either the same compositions or the different compositions.

Examples of the inorganic binder in the plug material paste or the sealing material paste include silica sol, alumina sol, and the like. Each of these materials may be used alone, or two or more kinds of these may be used in combination. Silica sol is desirable among the inorganic binders.

Examples of the organic binder in the plug material paste or the sealing material paste include polyvinyl alcohol, methyl cellulose, ethyl cellulose, carboxymethylcellulose, and the like. Each of these may be used alone or two or more kinds of these may be used in combination. Carboxymethylcellulose is desirable among the organic binders.

Examples of the inorganic fibers in the plug material paste or the sealing material paste include ceramic fibers and the like such as silica-alumina, mullite, alumina, and silica. Each of these may be used alone or two or more kinds of these may be used in combination. Alumina fibers are desirable among the inorganic fibers.

Examples of the inorganic particles in the plug material paste or the sealing material paste include carbides, nitrides, and the like, and specific examples thereof include inorganic powder or the like made from silicon carbide, silicon nitride, boron nitride and the like. Each of these may be used alone, or two or more kinds of these maybe used in combination. Out of the inorganic particles, silicon carbide is desirably used due to its superior thermal conductivity.

Furthermore, a pore-forming agent such as balloons that are fine hollow spheres including oxide-based ceramics, spherical acrylic particles, graphite and the like may be added to the plug material paste or the sealing material paste, if necessary. The balloon is not particularly limited, and examples thereof include alumina balloon, glass micro balloon, shirasu balloon, fly ash balloon (FA balloon), mullite balloon and the like. Alumina balloon is desirable out of these.

A method for sealing the cells is not particularly limited. The cells may be sealed at either one end with the above described plug material paste, which is filled thereinto and dried to be solidified, or with a plug including a resin, a ceramic, a metal or the like, which is inserted into the cells (through holes).

An application of the honeycomb structure according to the embodiments of the present invention is not limited to the exhaust gas purifying apparatus for diesel cars. By supporting three-way catalyst, the honeycomb structure according to the embodiments of the present invention may be applied to an exhaust gas purifying apparatus for gasoline cars.

A method for bonding the honeycomb members in the second embodiment is not particularly limited. An aggregated body of the honeycomb members may be produced by bonding the plurality of honeycomb members by using a method in which each of the honeycomb members is temporally fixed in a molding frame having the virtually same shape as the honeycomb block to be produced and the sealing material paste is injected into the each gap between the honeycomb members.

The number and shapes of the honeycomb members are not particularly limited.

A method for supporting a catalyst on the wall portion of the honeycomb member in the second embodiment is not particularly limited. A method may be used in which a honeycomb block with no catalyst supported on the wall portion of the honeycomb members is produced, and the honeycomb block is immersed in an alumina slurry and catalyst solution, and then fired.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure comprising:
   at least one honeycomb member comprising inorganic fibers and having a longitudinal direction and walls extending along the longitudinal direction to define cells which are sealed at either one end;
   a catalyst provided on the wall, an amount of the catalyst being at least about 100 g and at most about 400 g per liter of volume of the honeycomb structure, the honeycomb member having a pore distribution measured using mercury porosimetry in which a pore distribution curve has a first peak in a range from about 0.005 µm to about 0.03 µm of a pore diameter, a second peak in a range from about 1 µm to about 15 µm of the pore diameter, and a third peak in a range from about 15 µm to about 50 µm of the pore diameter, the pore distribution curve being drawn by plotting the pore diameter (µm) on an X-axis and a log differential pore volume (mL/g) on a Y-axis.

2. The honeycomb structure according to claim 1, wherein
   said honeycomb member further comprises an inorganic material;
   said inorganic fibers are fixed via the inorganic material; and
   said inorganic material exists at an intersection of the inorganic fibers or in a vicinity of the intersection.

3. The honeycomb structure according to claim 2, wherein
   said inorganic material contains silica which is melted and solidified to fix said inorganic fibers to each other.

4. The honeycomb structure according to claim 3, wherein
   said inorganic material comprises inorganic glass.

5. The honeycomb structure according to claim 4, wherein
   said inorganic glass comprises at least one of silicate glass, silicate alkali glass, and borosilicate glass.

6. The honeycomb structure according to claim 1, wherein
   said catalyst comprises:
   a catalyst component to convert NOx, a catalyst component to convert SOx, or a catalyst component to convert CO and HC; and
   an oxide.

7. The honeycomb structure according to claim 6, wherein
said catalyst component to convert NOx comprises at least one of an alkali metal, an alkali-earth metal, zeolite, and titania.

8. The honeycomb structure according to claim 7, wherein
said alkali metal comprises at least one of potassium and sodium, and
said alkali-earth metal comprises barium.

9. The honeycomb structure according to claim 6, wherein
said catalyst component to convert SOx comprises a catalyst to oxidize SOx, and
a sulfur sorbent to absorb the oxidized SOx is provided on said honeycomb structure.

10. The honeycomb structure according to claim 9, wherein
said sulfur sorbent comprises MgO.

11. The honeycomb structure according to claim 6, wherein
said catalyst component to convert CO and HC comprises a noble metal.

12. The honeycomb structure according to claim 11, wherein
said noble metal comprises at least one of platinum, palladium, and rhodium.

13. The honeycomb structure according to claim 6, wherein
said oxide comprises at least one of alumina, ceria, zirconia, silica, and mullite.

14. The honeycomb structure according to claim 1, wherein
said at least one honeycomb member comprises a single honeycomb member.

15. The honeycomb structure according to claim 1, wherein
said at least one honeycomb member comprises a plurality of honeycomb members which are bonded together with an adhesive layer interposed between the honeycomb members to form a honeycomb block.

16. The honeycomb structure according to claim 15, further comprising:
a sealing material layer provided on a peripheral face of the honeycomb block.

17. The honeycomb structure according to claim 1, wherein
the cells are sealed at either one end with a plug, and
the plug is formed by drying and solidifying a plug material paste filled into the cells.

18. The honeycomb structure according to claim 1, wherein
the cells are sealed at either one end with a plug inserted therein, and
the plug comprises a resin, a ceramic, or a metal.

19. The honeycomb structure according to claim 1, wherein
a porosity of the honeycomb member on which the catalyst is provided is at least about 35% and at most about 50%.

20. The honeycomb structure according to claim 1, wherein
a material of the inorganic fibers comprises at least one of an oxide ceramic, a nitride ceramic, a carbide ceramic, and basalt.

21. The honeycomb structure according to claim 1, wherein
a material of the inorganic fibers comprises at least one of silicon carbide, alumina, basalt, silica, silica-alumina, titania, and zirconia.

22. The honeycomb structure according to claim 1, wherein
the honeycomb structure has an apparent density of at least about 0.04 g/cm$^3$ and at most about 0.4 g/cm$^3$.

23. An exhaust gas purifying apparatus comprising:
a honeycomb structure;
a holding material wrapped around a peripheral portion of said honeycomb structure; and
a metal casing which houses said honeycomb structure around which said holding material is wrapped, the honeycomb structure comprising:
at least one honeycomb member comprising inorganic fibers and having a longitudinal direction and walls extending along the longitudinal direction to define cells which are sealed at either one end;
a catalyst provided on the wall, an amount of the catalyst being at least about 100 g and at most about 400 g per liter of volume of the honeycomb structure, the honeycomb member having a pore distribution measured using mercury porosimetry in which a pore distribution curve has a first peak in a range from about 0.005 μm to about 0.03 μm of a pore diameter, a second peak in a range from about 1 μm to about 15 μm of the pore diameter, and a third peak in a range from about 15 μm to about 50 μm of the pore diameter, the pore distribution curve being drawn by plotting the pore diameter (μm) on an X-axis and a log differential pore volume (mL/g) on a Y-axis.

24. The exhaust gas purifying apparatus according to claim 23, wherein the metal casing comprises
an inlet pipe through which exhaust gas is introduced into the metal casing, and
an outlet pipe through which the exhaust gas is discharged from the metal casing.

25. The exhaust gas purifying apparatus according to claim 23, wherein
said honeycomb member further comprises an inorganic material,
said inorganic fibers are fixed via the inorganic material, and
said inorganic material exists at an intersection of the inorganic fibers or in a vicinity of the intersection.

26. The exhaust gas purifying apparatus according to claim 25, wherein
said inorganic material contains silica which is melted and solidified to fix said inorganic fibers to each other.

27. The exhaust gas purifying apparatus according to claim 26, wherein
said inorganic material comprises inorganic glass.

28. The exhaust gas purifying apparatus according to claim 27, wherein
said inorganic glass comprises at least one of silicate glass, silicate alkali glass, and borosilicate glass.

29. The exhaust gas purifying apparatus according to claim 23,
wherein
said catalyst comprises:
a catalyst component to convert NOx, a catalyst component to convert SOx, or a catalyst component to convert CO and HC; and
an oxide.

30. The exhaust gas purifying apparatus according to claim 29,
wherein
said catalyst component to convert NOx comprises at least one of an alkali metal, an alkali-earth metal, zeolite, and titania.

31. The exhaust gas purifying apparatus according to claim 30,
wherein
said alkali metal comprises at least one of potassium and sodium, and
said alkali-earth metal comprises barium.

32. The exhaust gas purifying apparatus according to claim 29,
wherein
said catalyst component to convert SOx comprises a catalyst to oxidize SOx, and
a sulfur sorbent to absorb the oxidized SOx is provided on said honeycomb structure.

33. The exhaust gas purifying apparatus according to claim 32,
wherein
said sulfur sorbent comprises MgO.

34. The exhaust gas purifying apparatus according to claim 29,
wherein
said catalyst component to convert CO and HC comprises a noble metal.

35. The exhaust gas purifying apparatus according to claim 34,
wherein
said noble metal comprises at least one of platinum, palladium, and rhodium.

36. The exhaust gas purifying apparatus according to claim 29,
wherein
said oxide comprises at least one of alumina, ceria, zirconia, silica, and mullite.

37. The exhaust gas purifying apparatus according to claim 23,
wherein
said at least one honeycomb member comprises a single honeycomb member.

38. The exhaust gas purifying apparatus according to claim 23,
wherein
said at least one honeycomb member comprises a plurality of honeycomb members which are bonded together with an adhesive layer interposed between the honeycomb members to form a honeycomb block.

39. The exhaust gas purifying apparatus according to claim 38, further comprising:
a sealing material layer provided on a peripheral face of the honeycomb block.

40. The exhaust gas purifying apparatus according to claim 23,
wherein
the cells are sealed at either one end with a plug, and
the plug is formed by drying and solidifying a plug material paste filled into the cells.

41. The exhaust gas purifying apparatus according to claim 23,
wherein
the cells are sealed at either one end with a plug inserted therein, and
the plug comprises a resin, a ceramic, or a metal.

42. The exhaust gas purifying apparatus according to claim 23,
wherein
a porosity of the honeycomb member on which the catalyst is
provided is at least about 35% and at most about 50%.

43. The exhaust gas purifying apparatus according to claim 23,
wherein
a material of the inorganic fibers comprises at least one of an oxide ceramic, a nitride ceramic, a carbide ceramic, and basalt.

44. The exhaust gas purifying apparatus according to claim 23,
wherein
a material of the inorganic fibers comprises at least one of silicon carbide, alumina, basalt, silica, silica-alumina, titania, and zirconia.

45. The exhaust gas purifying apparatus according to claim 23,
wherein
the honeycomb structure has an apparent density of at least about 0.04 g/cm$^3$ and at most about 0.4 g/cm$^3$.

46. The exhaust gas purifying apparatus according to claim 23, wherein the exhaust gas purifying apparatus is so constructed to be used for a diesel car.

47. The exhaust gas purifying apparatus according to claim 23, wherein the exhaust gas purifying apparatus is so constructed to be used for a gasoline car.

* * * * *